United States Patent
Cha et al.

(10) Patent No.: US 9,989,253 B2
(45) Date of Patent: Jun. 5, 2018

(54) COMBUSTION INSTABILITY CONTROL METHOD

(71) Applicants: Hanbat National University Industry-Academic Cooperation Foundation, Daejeon (KR); Hyundai Heavy Industries Co., Ltd., Ulsan (KR)

(72) Inventors: Dong Jin Cha, Daejeon (KR); Won Joon Song, Chungcheongnam-do (KR); Kwang Ho Ahn, Daejeon (KR); Gwang Nyeon Ryu, Seoul (KR)

(73) Assignees: Hanbat National University Industry-Academic Cooperation Foundation, Daejeon (KR); Hyundai Heavy Industries Co., Ltd., Ulsan (KR)

( * ) Notice: Subject to any disclaimer, the term of this patent is extended or adjusted under 35 U.S.C. 154(b) by 246 days.

(21) Appl. No.: 14/772,288

(22) PCT Filed: Nov. 20, 2013

(86) PCT No.: PCT/KR2013/010580
§ 371 (c)(1),
(2) Date: Sep. 2, 2015

(87) PCT Pub. No.: WO2015/034133
PCT Pub. Date: Mar. 12, 2015

(65) Prior Publication Data
US 2015/0377485 A1    Dec. 31, 2015

(30) Foreign Application Priority Data
Sep. 5, 2013 (KR) .................. 10-2013-0106596

(51) Int. Cl.
F02C 9/28 (2006.01)
F23N 5/24 (2006.01)
(Continued)

(52) U.S. Cl.
CPC .............. F23N 5/242 (2013.01); F02C 9/00 (2013.01); F02C 9/28 (2013.01); F23N 5/00 (2013.01);
(Continued)

(58) Field of Classification Search
CPC .......... F05D 2270/083; F05D 2270/09; F05D 2270/114; F05D 2270/14; F05D 2270/333;
(Continued)

(56) References Cited

U.S. PATENT DOCUMENTS 6,810,320 B2   10/2004  Yamamoto et al.
7,089,746 B2 *  8/2006  Lieuwen ............... F01D 21/003
                                                        431/114
(Continued)

FOREIGN PATENT DOCUMENTS

JP    2007-192138 A    8/2007
KR    2003-0036206 A   5/2003
(Continued)

OTHER PUBLICATIONS

Lieuwen, T., Acoustic Detection of Imminent Blowout in Pilot and Swirl Stabilized Combustors, Jun. 16-19, ASME/IGTI Turbo Expo 2003, GT 2003-38074, pp. 1-10.*
(Continued)

*Primary Examiner* — Gerald L Sung
*Assistant Examiner* — Scott Walthour
(74) *Attorney, Agent, or Firm* — Blank Rome LLP

(57) ABSTRACT

A gas turbine combustion instability control device has a combustion unit provided with a hollow combustion cham-
(Continued)

ber, a gas turbine connected to the inside of the combustion chamber and a dynamic pressure sensor which is provided to the inside of the combustion chamber and measures the combustion dynamics of the inside of the combustion chamber; a diagnosis module which processes combustion dynamic pressure signals (p) according to the combustion dynamics measured by the dynamic pressure sensor to calculate the kurtosis value (k) of the dynamic pressure signals, and compares the same with a kurtosis reference value ($k_{th}$) to evaluate the combustion instability; and a combustion control unit for controlling the operation of the combustion part according to the determination of the diagnosis module.

2 Claims, 6 Drawing Sheets

(51) Int. Cl.
| | | |
|---|---|---|
| *F23N 5/00* | (2006.01) | |
| *F23N 5/16* | (2006.01) | |
| *F02C 9/00* | (2006.01) | |
| *F23R 3/28* | (2006.01) | |

(52) U.S. Cl.
CPC ............... *F23N 5/16* (2013.01); *F23R 3/28* (2013.01); *F05D 2270/083* (2013.01); *F05D 2270/09* (2013.01); *F05D 2270/114* (2013.01); *F05D 2270/14* (2013.01); *F05D 2270/301* (2013.01); *F05D 2270/333* (2013.01); *F05D 2270/334* (2013.01); *F23N 2023/00* (2013.01); *F23N 2025/04* (2013.01); *F23N 2041/20* (2013.01); *F23N 2900/05005* (2013.01); *F23R 2900/00005* (2013.01); *F23R 2900/00013* (2013.01)

(58) Field of Classification Search
CPC .. F05D 2270/334; F23N 5/16; F23N 2023/00; F23N 2900/05005; F23R 2900/00005; F23R 2900/00013
See application file for complete search history.

(56) References Cited

U.S. PATENT DOCUMENTS

| | | | | |
|---|---|---|---|---|
| 7,454,892 | B2* | 11/2008 | Lieuwen | F23D 14/725 60/39.091 |
| 2005/0056024 | A1* | 3/2005 | Lieuwen | F23D 14/725 60/779 |
| 2006/0137353 | A1* | 6/2006 | Lieuwen | F01D 21/003 60/772 |
| 2010/0180674 | A1 | 7/2010 | Ziminsky et al. | |
| 2010/0287939 | A1* | 11/2010 | Cornwell | F23C 7/002 60/748 |

FOREIGN PATENT DOCUMENTS

| | | |
|---|---|---|
| KR | 10-2004-0037985 A | 5/2004 |
| KR | 10-2011-0118488 A | 10/2011 |
| KR | 10-2013-0060962 A | 6/2013 |

OTHER PUBLICATIONS

Gutmark, E., Lean Blowout Features and Control in a Swirl-Stabilized, Partially Premixed Gas Turbine Combustor, Jan. 9-12, 2006, 44th AIAA Aerospace Sciences Meeting and Exhibit, AIAA 2006-959, pp. 1-9.*

Cha, D., Song, W.J., Temporal Kurtosis of Dynamic Pressure Signal as a Quantitative Measure of Combustion Instability, May 2016, Applied Thermal Engineering, Applied Thermal Engineering 104(2016), pp. 577-586.*

* cited by examiner

COMBUSTION INSTABILITY CONTROL METHOD

TECHNICAL FIELD

This disclosure relates to a device for measuring combustion dynamics of a gas turbine, and more particularly, to a control device for measuring and controlling combustion instability in a combustor and a control method thereof.

BACKGROUND ART

Generally, a gas turbine briefly includes a compressor, a combustor and a turbine, and the air compressed in the compressor is mixed with a fuel and burned in the combustor. At this time, chemical energy is converted into thermal energy and then into kinetic energy, and the generated gas operates the turbine. The combustion in the gas turbine has been changed from diffusion flame into premixed flame according to the generated combustion pattern. Combustion near a theoretical air-fuel ratio increases exhaust emissions due to thermal NOx. Also, as regulations on exhaust emissions become stricter due to the increased interest on environments, the lean-burn concept becomes more important as an effort to cope with the above trend.

However, in the lean burn, flame becomes unstable near a lean limit.

In order to solve this problem, a method for measuring and controlling combustion instability by means of signal processing has been proposed. As an example of the combustion instability measurement, Korean Unexamined Patent Publication No. 2003-0036206 discloses a device for combustion diagnosis/combustion control of an internal combustion engine, which adjusts a combustion state when knocking, accidental fire or extinction occurs so that the engine may normally operate, and which allows rapid detection of an abnormality in internal pressure detection so that the abnormality may be handled without stopping the engine. This device includes a means for calculating a peak pressure ratio ($P_p/P_0$) of an internal peak pressure ($P_p$) to a compression pressure ($P_0$) of a single point or multiple points in a compression stroke according to a detected internal pressure from an internal pressure detector which detects a pressure in the combustion chamber, a means for comparing the peak pressure ratio ($P_p/P_0$) with a pressure ratio (hereinafter, referred to as a threshold pressure ratio) set step by step for each diagnosis category, and a means for determining the comparison output at each single cycle or multiple cycles and diagnosing a combustion state such as an internal pressure state in the combustion chamber. And, the disclosed method for diagnosing and controlling combustion of an internal combustion engine includes a step for calculating a peak pressure ratio ($P_p/P_0$) of an internal peak pressure ($P_p$) to a compression pressure ($P_0$) of any point in a compression stroke and a step for calculating a combustion pressure ratio ($P_1/P_0$) of a pressure ($P_1$) of any point in a combustion stroke to a pressure ($P_0$) of any point in the compression stroke, wherein it is determined that an accidental fire occurs in the combustion chamber if the peak pressure ratio ($P_p/P_0$) is smaller than a set allowable lowest pressure ratio ($P_n$) ($P_p/P_0 \leq P_n$) and the combustion pressure ratio ($P_1/P_0$) is smaller than a set allowable accidental fire pressure ratio ($P_m$) ($P_1/P_0 \leq P_m$).

However, the existing combustion diagnosis device of an internal combustion engine is a control device for diagnosing combustion of the internal combustion engine by measuring a peak pressure of the internal combustion engine and a compression pressure of any point to calculate peak pressure ratio and comparing the peak pressure ratio with a combustion pressure ratio to check a combustion state in the combustion chamber.

Therefore, even though a combustion state of the internal combustion engine is checked by measuring the peak pressure and the compression pressure at any point, it is impossible to precisely determine combustion instability of the gas turbine.

DISCLOSURE

Technical Problem

This disclosure is directed to providing a combustion instability control device of a gas turbine and a control method thereof, which may determine occurrence of combustion instability in real time by measuring combustion dynamics of a gas turbine and processing signals based on the measured data.

Technical Solution

In one general aspect, there is provided a combustion instability control device of a gas turbine, which measures combustion dynamics of the gas turbine and controls operations of the gas turbine, the device comprising: a combustion unit provided with a hollow combustion chamber, a gas turbine connected to the inside of the combustion chamber, and a dynamic pressure sensor which is provided to the inside of the combustion chamber and measures combustion dynamics of the inside of the combustion chamber; a diagnosis module for processing combustion dynamic pressure signals (p) according to the combustion dynamics measured by the dynamic pressure sensor to calculate a kurtosis value (k) of the combustion dynamic pressure signals (p) and comparing the kurtosis value (k) with a kurtosis reference value ($k_{th}$) to evaluate combustion instability; and a combustion control unit configured to control operations of the combustion unit according to the determination of the diagnosis module.

In addition, the diagnosis module may determine the kurtosis value (k) of the combustion dynamic pressure signals (p) according to the following equation.

$$k = \frac{\frac{1}{n}\sum_{i=1}^{n}(p_i - \bar{p})^4}{\left[\frac{1}{n}\sum_{i=1}^{n}(p_i - \bar{p})^2\right]^2}$$

In addition, the diagnosis module may compare the kurtosis value (k) of the combustion dynamic pressure signals (p) with the kurtosis reference value ($k_{th}$) and determine that combustion instability occurs when the k is smaller than or equal to $k_{th}$.

In addition, the kurtosis reference value may satisfy a condition of $k_{th} = 1.5 + k_1 + k_2$.

In another aspect of the present disclosure, there is provided a combustion instability control method of a gas turbine, which measures combustion dynamics of the gas turbine and controls operations of the gas turbine, the method comprising: determining combustion dynamic pressure signals (p) according to combustion dynamics measured at the gas turbine; calculating a kurtosis value (k) of the combustion dynamics based on the combustion dynamic pressure signals (p); comparing the kurtosis value (k) of the combustion dynamic pressure signals (p) with a preset reference value ($k_{th}$) for determining combustion instability and determining that the gas turbine has combustion instability when the kurtosis value of the combustion dynamics is equal to or smaller than the reference value; and controlling combustion through load rejection when the gas turbine is determined as having combustion instability.

In addition, the kurtosis value (k) of the combustion dynamic pressure signals may be determined according to the following equation.

$$k = \frac{\frac{1}{n}\sum_{i=1}^{n}(p_i - \bar{p})^4}{\left[\frac{1}{n}\sum_{i=1}^{n}(p_i - \bar{p})^2\right]^2}$$

In addition, the kurtosis reference value $k_{th}$ may satisfy a condition of $k_{th} = 1.5 + k_1 + k_2$.

Advantageous Effects

A combustion instability control device of a gas turbine and a control method thereof according to the present disclosure give the following effects.

First, it is possible to easily determine combustion instability by measuring combustion dynamics of a gas turbine and processing signals based on the measured data.

Second, it is possible to overcome uncertainty of a root mean square and a damping ratio of the combustion dynamics, which have been used as factors in an existing combustion instability diagnosis method.

Third, the measured combustion dynamics may be directly analyzed in real time in time domains without being converted into frequency domains, and thus additional signal processing for converting is not necessary.

BEST MODE

The present disclosure provides a combustion instability control device of a gas turbine, which comprises: a combustion unit provided with a hollow combustion chamber, a gas turbine connected to the inside of the combustion chamber, and a dynamic pressure sensor which is provided to the inside of the combustion chamber and measures combustion dynamics of the inside of the combustion chamber; a diagnosis module for processing combustion dynamic pressure signals (p) according to the combustion dynamics measured by the dynamic pressure sensor to calculate a kurtosis value (k) of the combustion dynamic pressure signals (p) and comparing the kurtosis value (k) with a kurtosis reference value ($k_{th}$) to evaluate combustion instability; and a combustion control unit configured to control operations of the combustion unit according to the determination of the diagnosis module.

Mode for Invention

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Figure 1:
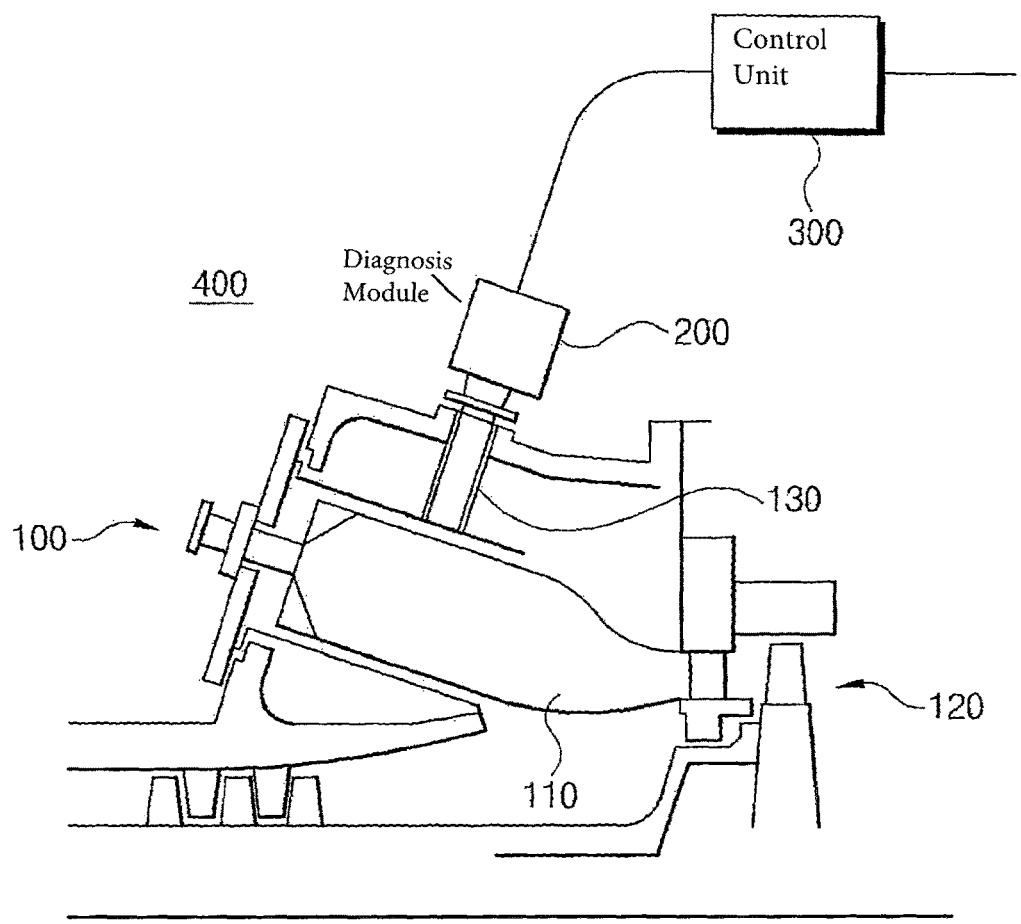
FIG. 1 is a diagram showing a combustion instability control device of a gas turbine according to an embodiment of the present disclosure.
Figure 2:
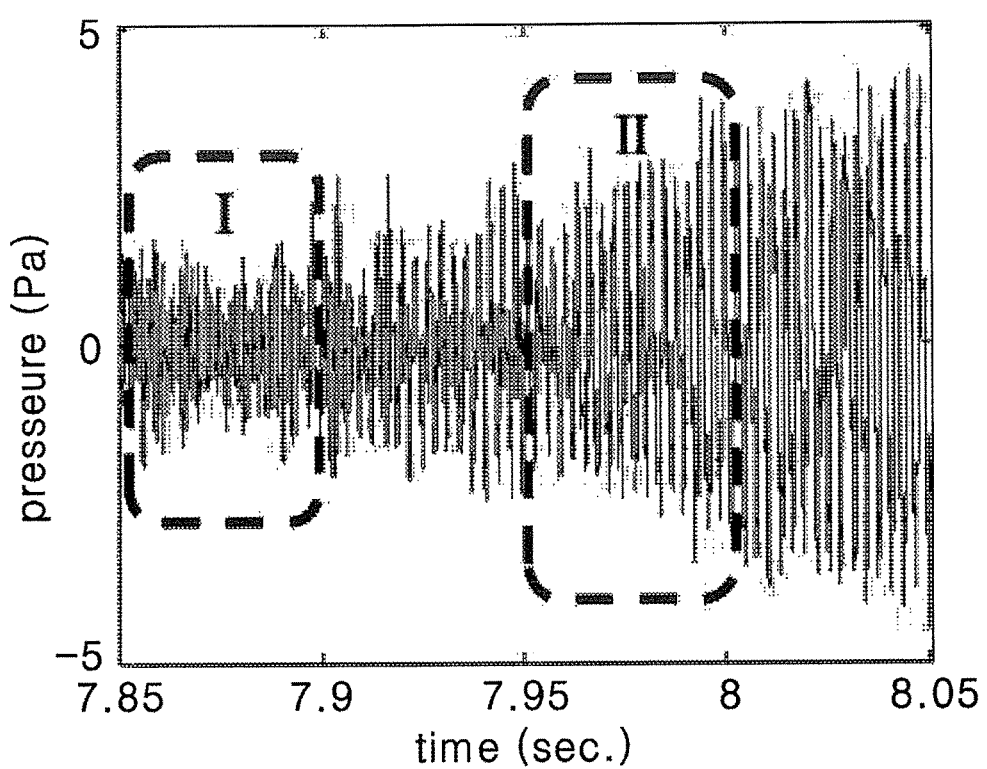
FIG. 2 is a graph showing an example in which combustion of a gas turbine is in transition from a stable region to an unstable region, by using data obtained by measuring combustion dynamics.
Figure 3:
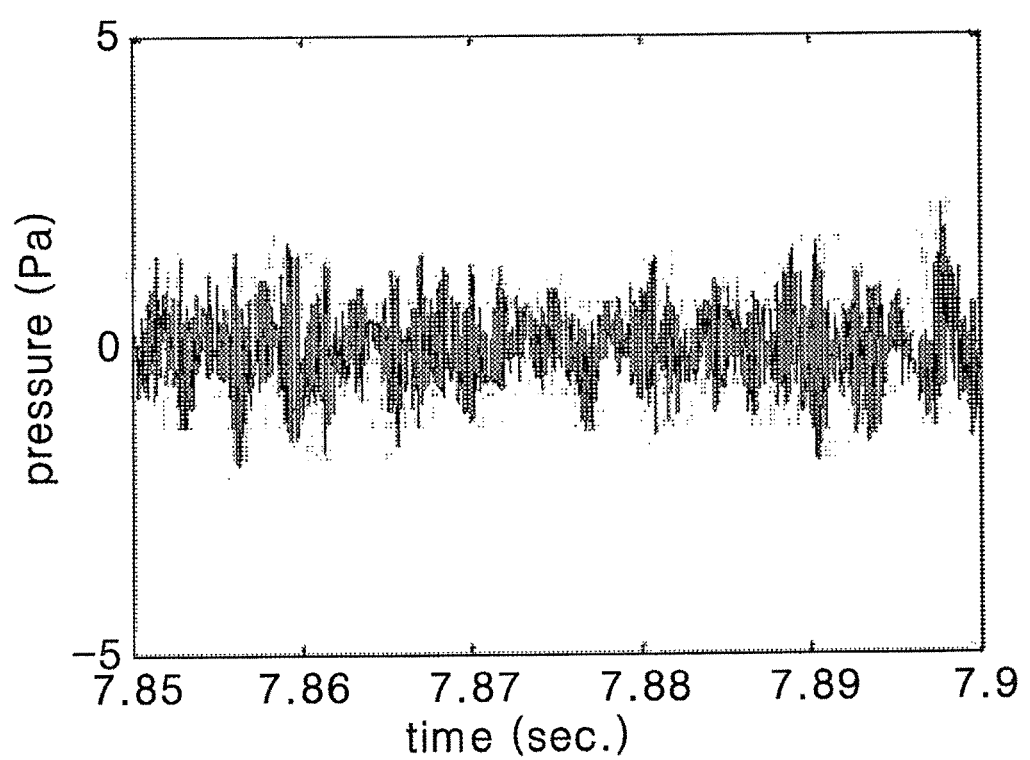
FIG. 3 is a graph showing an example in which combustion of a gas turbine is in a stable region, by using data obtained by measuring combustion dynamics.
Figure 4:
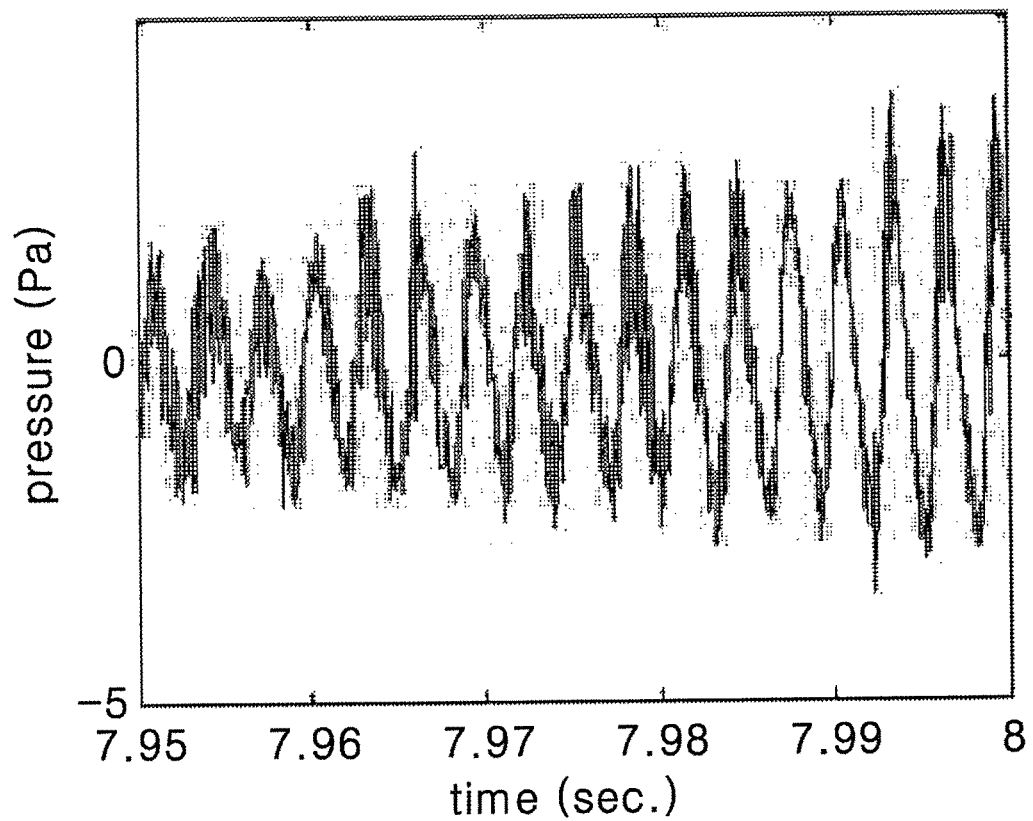
FIG. 4 is a graph showing an example in which combustion of a gas turbine is in an unstable region, by using data obtained by measuring combustion dynamics.
Figure 5:
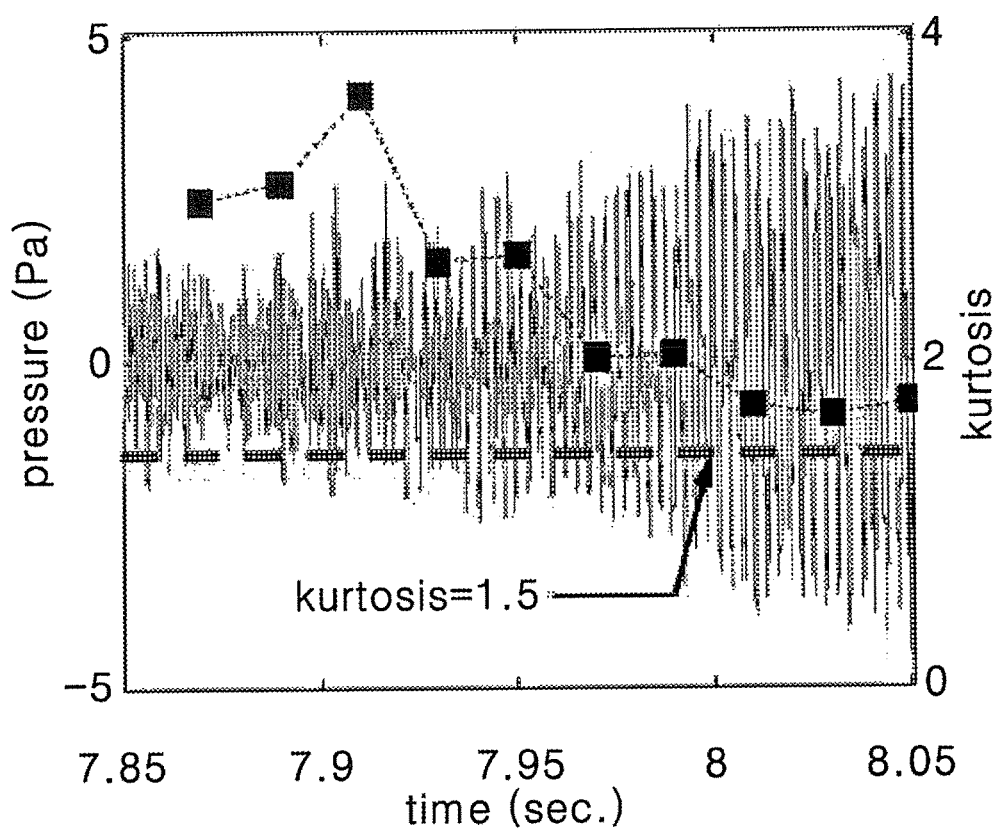
FIG. 5 is a graph showing a kurtosis value in time domains, for data obtained by measuring combustion dynamics.

FIG. 1 is a diagram showing a combustion instability control device of a gas turbine according to an embodiment of the present disclosure, FIG. 2 is a graph showing an example in which combustion of a gas turbine is in transition from a stable region to an unstable region, by using data obtained by measuring combustion dynamics, FIG. 3 is a graph showing an example in which combustion of a gas turbine is in a stable region, by using data obtained by measuring combustion dynamics, FIG. 4 is a graph showing an example in which combustion of a gas turbine is in an unstable region, by using data obtained by measuring combustion dynamics, and FIG. 5 is a graph showing a kurtosis value in time domains, for data obtained by measuring combustion dynamics.

First, referring to FIG. 1, a combustion instability control device of a gas turbine according to an embodiment of the present disclosure detects combustion instability of various combustors such as a gas turbine and reduces combustion instability by using the detected data so that the gas turbine may stably and efficiently operate. For this, the combustion instability control device 400 of a gas turbine includes a combustion unit 100, a diagnosis module 200 and a combustion control unit 300.

Here, the combustion unit 100 includes a hollow combustion chamber 110, a gas turbine 120 connected to the inside of the combustion chamber, and a dynamic pressure sensor 130 which is provided to the inside of the combustion chamber 110 and measures combustion dynamics of the inside of the combustion chamber 110.

A compressed air and fuel are supplied to the combustion chamber 110 to generate combustion. The gas combusted in the combustion chamber 110 may operate the gas turbine 120 to generate power. In the combustion chamber 110, if combustion initiates near a lean limit, combustion instability may happen in the combustion chamber 110.

The dynamic pressure sensor 130 is mounted in the combustion chamber 110, but the dynamic pressure sensor 130 may also be connected to a conduit connected to the combustion chamber 110. The dynamic pressure sensor 130 measures combustion instability generated when a combustion heat release fluctuation generated in the combustion chamber 110 interacts with an acoustic pressure perturbation of a medium in the combustion chamber 110. The acoustic oscillation generated at this time may cause structural vibration and resonance of the combustor.

The dynamic pressure sensor 130 may employ a piezoelectric pressure transducer and have a pressure range of 0.3 psi to 15 psi. In addition, since physical characteristics may vary depending on use frequency and use conditions, a correction system may be provided to correct the dynamic pressure sensor 130 before and after measurement.

The measurement value detected by the dynamic pressure sensor 130 is converted into an electric signal for numerical analysis to generate combustion dynamic pressure signals (p), and the combustion dynamic pressure signals (p) are transmitted to the diagnosis module 200 later.

The combustion instability measured in the combustion chamber 110 is a kind of resonance, in which a response to a resonance frequency component is dominantly increasing in comparison to responses to other frequency components. Therefore, if the combustion instability occurs, a response to the resonance frequency component appears as a sinusoid having great amplitude naturally, and responses to other frequency components appear as fine noise components.

The diagnosis module 200 processes combustion dynamic pressure signals (p) according to the combustion dynamics measured by the dynamic pressure sensor 130 to calculate a kurtosis value (k) of the combustion dynamic pressure signals (p), and compares the kurtosis value (k) with a kurtosis reference value to determine combustion instability. Here, the kurtosis is a factor representing a probability distribution pattern of given data.

The diagnosis module 200 determines the kurtosis value (k) of the combustion dynamic pressure signals (p) according to the following equation.

$$k = \frac{\frac{1}{n}\sum_{i=1}^{n}(p_i - \bar{p})^4}{\left[\frac{1}{n}\sum_{i=1}^{n}(p_i - \bar{p})^2\right]^2} \quad \text{Equation 1}$$

In Equation 1, n represents the number of combustion dynamics data included in a set signal processing cycle for calculating kurtosis, $p_i$ represents actually measured combustion dynamic pressure signals at time $t=t_i$ (i=1, 2, 3, . . . , n), and $\bar{p}$ represents a mean value of the combustion dynamic pressure signals (p).

A kurtosis value for the data representing normal distribution is 3, and a kurtosis value of a pure sinusoid pattern is 1.5.

FIG. 2 is a graph showing an example in which combustion of a gas turbine is in transition from a stable region to an unstable region, by using data obtained by measuring combustion dynamics, FIG. 3 is a graph showing an example in which combustion of a gas turbine is in a stable region, by using data obtained by measuring combustion dynamics, and FIG. 4 is a graph showing an example in which combustion of a gas turbine is in an unstable region, by using data obtained by measuring combustion dynamics.

Referring to the figures, a region I represents a case where the gas turbine performs stable combustion in the combustion chamber 110. In the region I, it can be found that a waveform is in a stable region in comparison to a graph waveform when the gas turbine of FIG. 3 performs combustion in a stable region. A region II is a graph showing a dynamic pressure when the gas turbine starts combustion instability in the combustion chamber 110, and it can be found that a waveform of the region II is in an unstable region in comparison to the graph waveform when the gas turbine of FIG. 4 performs combustion in an unstable region.

It can be found that a noise component is present only in the region I, but fine noise components of a sinusoid with great amplitude are present only in the region II. In the combustion dynamics data, a sinusoid corresponding to a resonance frequency becomes dominant from the point where combustion instability occurs.

FIG. 5 is a graph showing a kurtosis value in time domains, for data obtained by measuring combustion dynamics.

Referring to FIG. 5, the kurtosis value 1.5 for a sinusoid provides a reference value for diagnosing combustion instability using combustion dynamics. The kurtosis value (k) obtained by numerically calculating the combustion dynamic pressure signals (p) is approximate to 1.5 since the waveform of the combustion dynamics measured when combustion instability occurs in the combustion chamber 110 shows sinusoid characteristics very much.

Therefore, the kurtosis value for combustion dynamics becomes close to 1.5 as combustion instability increases further in time domains.

Meanwhile, the diagnosis module 200 compares the kurtosis value (k) of the combustion dynamic pressure signals (p) with the kurtosis reference value ($k_{th}$) and determines that there is combustion instability when the kurtosis value (k) is smaller than or equal to the reference value ($k_{th}$).

Here, the kurtosis reference value is determined according to the following equation.

$$k_{th} = 1.5 + k_1 + k_2 \quad \text{Equation 2}$$

In Equation 2, 1.5 represents a kurtosis value for a sinusoid function, $k_1$ represents a correction value for the kurtosis 1.5 of the sinusoid function, which is generated while discretizing successive combustion dynamics and is calculated according a sampling frequency of a combustion dynamics measurement device and a processing cycle of a dynamic pressure signal.

$k_2$ represents a correction value empirically calculated according to a combustion characteristic and may be selected by a user in consideration of operation conditions, safety coefficients and economic feasibility.

Hereinafter, a combustion instability control method using the combustion instability control device of a gas turbine will be described.

Figure 6:
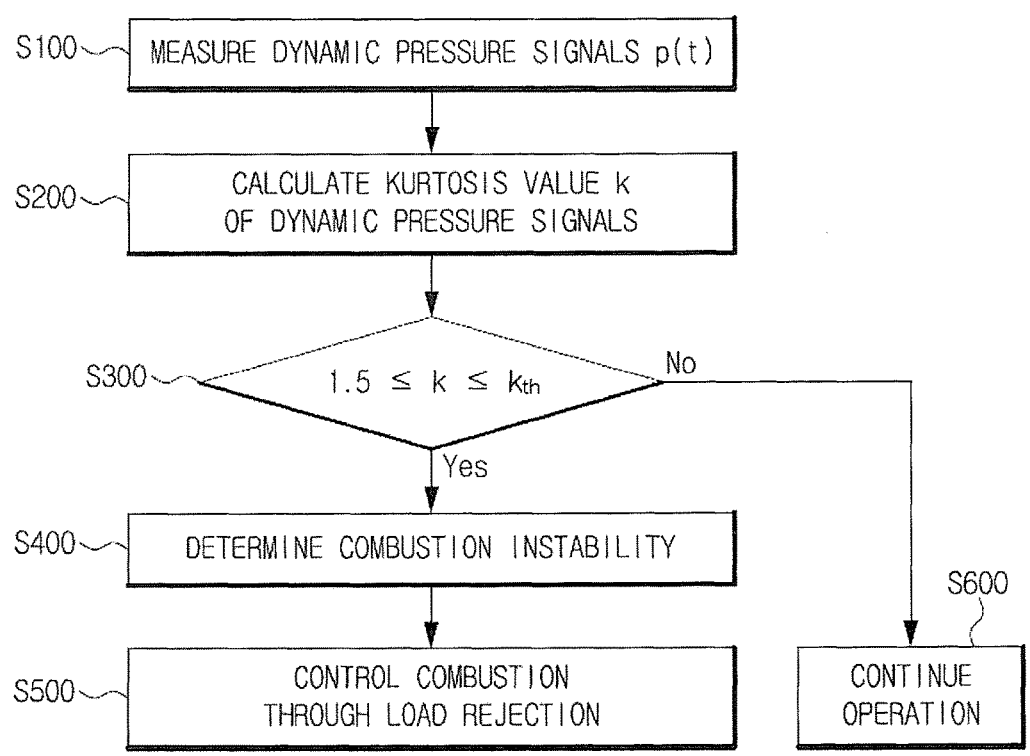
FIG. 6 is a flowchart for illustrating a control method of the combustion instability control device of a gas turbine, depicted in FIG. 1.

FIG. 6 is a flowchart for illustrating a control method of the combustion instability control device 400 of a gas turbine, depicted in FIG. 1.

In another aspect of the present disclosure, the combustion instability control method of a gas turbine controls combustion instability of a gas turbine by using the combustion instability control device 400 of a gas turbine. Here, the gas turbine combustion instability control device also includes a combustion unit 100, a diagnosis module 200 and a combustion control unit 300.

First, a compressed air and fuel are injected to the combustion unit 100 provided at the gas turbine, and the gas turbine starts combustion. The combustion instability may appear as combustion starts near a lean limit in the combustion chamber 110.

At this time, the combustion dynamic pressure signals (p) are determined according to the combustion dynamics measured in the gas turbine (S100).

The combustion dynamic pressure signals (p) are converted into an electric signal in order to process the measured combustion dynamics detected by the dynamic pressure sensor 130 provided at the combustion unit 100, and then the combustion dynamic pressure signals (p) are transmitted to the diagnosis module.

The kurtosis value (k) of the combustion dynamic pressure signals is calculated based on the combustion dynamic pressure signals (p) (S200).

Here, the kurtosis value (k) is determined according to the following equation.

$$k = \frac{\frac{1}{n}\sum_{i=1}^{n}(p_i - \bar{p})^4}{\left[\frac{1}{n}\sum_{i=1}^{n}(p_i - \bar{p})^2\right]^2}$$

Here, n represents the number of combustion dynamics data included in a set signal processing cycle for calculating kurtosis, $p_i$ represents actually measured combustion dynamic pressure signals at time $t=t_i$ ($i=1, 2, 3, \ldots, n$), and $\bar{p}$ represents a mean value of the combustion dynamic pressure signals (p).

The kurtosis reference value $k_{th}$ may satisfy the following condition of $k_{th}=1.5+k_1+k_2$.

Here, 1.5 represents a kurtosis value for a sinusoid function, $k_1$ represents a correction value for the kurtosis 1.5 of the sinusoid function, which is calculated according to a sampling frequency of a combustion dynamics measurement device and a processing cycle of a dynamic pressure signal, and $k_2$ represents a constant empirically calculated according to a combustion characteristic.

The kurtosis value (k) of the combustion dynamic pressure signals is compared with a reference value ($k_{th}$) for determining preset combustion instability (S300), and if the kurtosis value (k) of the combustion dynamic pressure signals is equal to or smaller than the reference value, it is determined that the gas turbine has combustion instability (S400).

In S300 for determining whether the gas turbine has combustion instability, the calculated kurtosis value (k) of the combustion dynamics is compared with the reference value ($k_{th}$) for determining preset combustion instability, and if the kurtosis value of the combustion dynamics exceeds the reference value, the gas turbine is controlled to continue operating (S600).

Here, the combustion instability occurs when the kurtosis value (k) of the combustion dynamic pressure signals satisfies the following equation while the gas turbine is actually operating. In this case, it is determined that combustion instability occurs (S400), and combustion of the gas turbine is controlled through load rejection (S500).

$$1.5 \leq k \leq k_{th} \qquad \text{Equation 3}$$

If the kurtosis value (k) of the combustion dynamic pressure signals is equal to or greater than the kurtosis value 1.5 of a sinusoid and equal to or smaller than the kurtosis reference value ($k_{th}$), it is determined that combustion instability occurs (S400).

In the present disclosure, in order to measure combustion dynamics of a gas turbine and control operations of the gas turbine, kurtosis of the combustion dynamics is calculated in real time, and particularly the measured combustion dynamic pressure signals are processed to select a kurtosis reference value, on which a correction value for the kurtosis value 1.5 for a sinusoid is reflected, as a factor for determining whether combustion instability occurs. Therefore, different from the existing techniques, the combustion dynamic pressure signals may be directly analyzed in time domains without being converted into frequency domains, and used for diagnosing combustion instability.

As described above, if the combustion instability control device of a gas turbine and the control method thereof according to the present disclosure are used, it is possible to easily determine combustion instability by measuring combustion dynamics of a gas turbine and processing signals based on the measured data. In addition, it is possible to overcome uncertainty of a root mean square and a damping ratio of the combustion dynamics, which have been used as factors of an existing combustion instability diagnosis method. Moreover, the measured combustion dynamics may be analyzed in real time directly in time domains without being not converted into frequency domains, and thus additional signal processing for converting is not necessary.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

The invention claimed is:

1. A method for controlling combustion instability in a gas turbine, the method comprising:
    generating combustion dynamic pressure signals based on dynamic pressures measured at a combustor of the gas turbine;
    calculating a kurtosis value from the combustion dynamic pressure signals, wherein the kurtosis value is calculated according to the following equation:

$$k = \frac{\frac{1}{n}\sum_{i=1}^{n}(p_i - \bar{p})^4}{\left[\frac{1}{n}\sum_{i=1}^{n}(p_i - \bar{p})^2\right]^2}$$

where k represents the kurtosis value, n represents a number of data points from the combustion dynamic pressure signals included in a set signal processing cycle for calculating the kurtosis, $p_i$ represents measured dynamic pressure at time $t=t_i$ ($i=1, 2, 3, \ldots, n$), and $\bar{p}$ represents a mean dynamic pressure value of the combustion dynamic pressure signals;
    comparing the kurtosis value with a preset reference value and determining that the gas turbine is experiencing combustion instability when the following relationship is true:

$$1.5 \leq k \leq k_{th}$$

where $k_{th}$ represents the preset reference value; and
    controlling combustion via load rejection when the gas turbine is determined to be experiencing combustion instability.

2. The method for controlling combustion instability according to claim 1,
    wherein comparing the kurtosis value with the preset reference value further comprises determining that the gas turbine is not experiencing combustion instability when the kurtosis value is greater than the preset reference value; and controlling the gas turbine to continue operating when the gas turbine is determined to not be experiencing combustion instability.

* * * * *